US006707869B1

(12) United States Patent
Zhang

(10) Patent No.: US 6,707,869 B1
(45) Date of Patent: Mar. 16, 2004

(54) SIGNAL-PROCESSING APPARATUS WITH A FILTER OF FLEXIBLE WINDOW DESIGN

(75) Inventor: Shude Zhang, Kanata (CA)

(73) Assignee: Nortel Networks Limited, St-Laurent (CA)

( * ) Notice: Subject to any disclaimer, the term of this patent is extended or adjusted under 35 U.S.C. 154(b) by 559 days.

(21) Appl. No.: 09/749,583

(22) Filed: Dec. 28, 2000

(51) Int. Cl.[7] ................................................ H04L 23/00

(52) U.S. Cl. ....................... 375/377; 704/200; 704/214; 704/233

(58) Field of Search ................................ 375/316, 350, 375/346, 285, 229, 232, 377; 708/323, 300; 333/18, 28 R; 704/200, 201, 203, 208, 211, 214, 231, 233, 270, 275

(56) References Cited

U.S. PATENT DOCUMENTS

| | | | | |
|---|---|---|---|---|
| 5,749,067 A | * | 5/1998 | Barrett | 704/233 |
| 5,963,901 A | * | 10/1999 | Vahatalo et al. | 704/233 |
| 6,061,647 A | * | 5/2000 | Barrett | 704/208 |
| 6,182,035 B1 | * | 1/2001 | Mekuria | 704/236 |
| 6,526,140 B1 | * | 2/2003 | Marchok et al. | 379/406.03 |

OTHER PUBLICATIONS

A.M. Kondoz; Digital Speech—Coding for LowBit Rate Communication Systems; John Wiley & Sons; pp 35 to 41.

International Telecommunication Union; CCITT, The International Telegraph and Telephone Consultative Committee; "General Aspects of Digital Transmission Systems; Terminal Equipments" "Coding of Speech at 16 kbit/s Using Low–Delay Code Excited Linear Prediction"; Geneva 1992, pp 1 to 63, G728.

ETSI EN 300 973 V7.0.1 (Jan. 2000) Global system for Mobile Communications; "Digital cellular telecommunications system (Phase 2+); Half rate speech; Voice Activity Detector (VAD) for half rate speech traffic channels (GSM 06.42 version 7.0.1 Release 1998)".

International Telecommunication Union; G.723.1 Annex A (11/96); Series G: Transmission Systems and Media; Digital transmission systems—Terminal equipments—Coding of analogue signals by methods other than PCM; "Dual rate speech coder for multimedia communications transmitting at 5.3 and 6.3 kbit/s" Annex A: Silence compression scheme; pp 1 to 15.

ETSI EN 300 965 V7.0.1 (Jan. 2000); Global System for Mobile Communications; Digital cellular telecommunications system (Phase 2+); Full rate speech; Voice Activity Detector (VAD) for full rate traffic channels (GSM 06.32 version 7.0.1 Release 1998); pp. 1 to 37.

International Telecommunication Union; G.728 Annex G (11/94); General Aspects of Digital Transmission Systems; "Coding of speech at 16 kbit/s using low–delay code excited linear prediction"; Annex G–16 kbit/s Fixed Point Specification; pp. 1 to 64.

* cited by examiner

*Primary Examiner*—Jean B. Corrielus

(57) ABSTRACT

A filter to apply a window function to a digital signal is provided. The filter has a memory for storing a basic set of values representing a single window. An adapter can generate from this basic set a plurality of adapted sets of values, where the adapted sets of values define window functions having different window sizes. The adapter has an input for receiving a control signal that allows the adapter to select the proper adapted set to suit the digital signal being processed. The application of the window function is effected on successive frames of the digital signal by using the adapted set of values generated by the adapter in response to the control signal. The filter has VAD applications, among others.

26 Claims, 2 Drawing Sheets

SIGNAL-PROCESSING APPARATUS WITH A FILTER OF FLEXIBLE WINDOW DESIGN

FIELD OF THE INVENTION

The invention relates to signal processing, in particular, the processing of digitized signals containing speech information. The invention provides a filter to apply a window function to a digital signal. The filter finds practical applications in Voice Activity Detection (VAD) applications, among others.

BACKGROUND OF THE INVENTION

Signal processing, in particular the processing of digital signals containing speech information, requires processing by one or more filters of window design to smoothly weigh the samples of the signal. Examples of window design filters include Hamming window filters, Hanning window filters, Blackman window filters and Bartlet window filters, among others. For example, a Hamming window is defined by the following equation:

$$\text{window}(i) = 0.54 - 0.46\cos\left(\frac{2\pi}{N-1}i\right);\ i = 0, 1, \ldots , N-1 \tag{1}$$

Where:

(a) i is the sample index in a frame;

(b) N is the number of samples per frame.

The equations that define a Hanning, Blackman and Bartlet window are not specified here since a person skilled in the art knows them.

In many signal-processing applications that require windowing, such as in VAD applications, it is customary to pre-calculate the equation defining the window function and store the resulting values in memory. In use, the values are recalled from memory and applied to the samples of the signal. This approach greatly reduces the computational requirements for real-time implementation by comparison to a calculation of the window equation for each sample of the block.

A problem arises when the signal processing apparatus is designed to window signals with different number of samples per block. In such a case, the window filter needs to be adapted from signal to signal. One possibility to effect this adaptation is to store in the memory sets of values obtained by pre-calculating the window equation for every possible signal having a different number of samples per block, where each set represents a different window. In use, only the set of values that corresponds to the signal currently being processed is employed to perform the application of the window function.

A disadvantage of this approach is the increased memory usage necessary to store the various sets of pre-calculate window values.

SUMMARY OF THE INVENTION

Under a first broad aspect, the invention provides a window filter that has an input to receive a digital signal having a plurality of successive frames, each frame having a known number of samples. The filter successively applies a window function to the successive frames of the digital signal. The filter includes:

1. a machine readable storage medium holding a basic set of values representing completely or partially a single window;
2. an adapter for producing from the basic set of values a plurality of adapted sets of values, where each adapted set of values defines completely or partially a window function and where the window functions of the adapted sets of values have windows of different sizes;
3. a computation unit to apply a window function to the frames of the digital signal by using an adapted set of values.

The advantage of this approach resides in the use of a basic set of values that represent partially or completely a single window and that are adaptable to produce adapted sets of values that define windows of different sizes. The memory requirements are reduced by comparison to a case where the memory holds a plurality of sets of values representing windows of different sizes. This is particularly true for real time implementation of a signal processing apparatus on a commercial digital signal processor where the internal memory is limited.

In a specific and non-limiting example of implementation, the window filter processes digital signals conveying voice information. The filter is part of a Linear Prediction (LP) based VAD whose output controls transmission of the encoded voice packets resulting from the operation of the chosen voice encoder and corresponding packetizer. The filter is of a Hamming window design, although other window functions can be used such as a Hanning, Blackman and Bartlet window, among others, without departing from the spirit of the invention. The window filter can process signals that require window sizes of either 240 samples or 264 samples, depending upon the encoding algorithm chosen.

The set of values to be stored in the filter memory is computed on the basis of equation (1) where N is chosen in the range defined by the smallest window size and the largest window size. For example, N is given the value of 256. To the values computed by equation (1) for N=256 are inserted eight 1's (the maximum value of a Hamming window) at the central portion of the window. This results in a window now defined by a set of 264 values, rather than 256. Finally, since the window is symmetrical, only half of it (132 values) is stored in the memory of the filter.

In use, when filtering a signal with a window having a size of 264 samples, the entire set of values (132 values) is used to process a block of 264 samples in the signal. In particular, the 132 values are used to multiply the corresponding first 132 samples of the 264 samples block. The same operation is performed on the last 132 samples of the 264 samples block, this time the order of the 132 values being reversed.

When a window having a size of 240 samples is required, only a sub-set of the basic set of values is selected to apply the window function on the 240 samples block. For instance, only the first 120 values of the basic set of values are used to window the 240 samples block, by the process described immediately above.

BRIEF DESCRIPTION OF THE DRAWINGS

A detailed description of examples of implementation of the present invention is provided hereinbelow with reference to the following drawings, in which.

Figure 1:
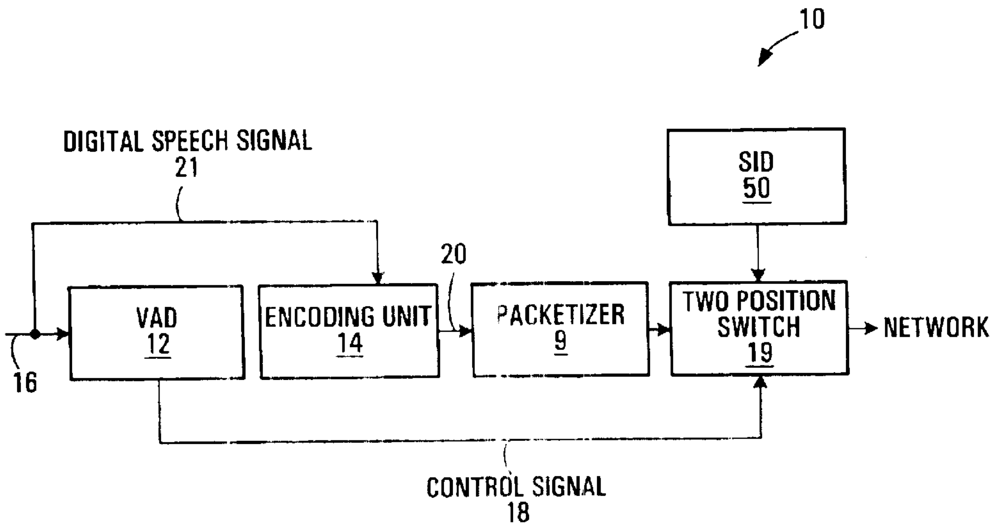
FIG. 1 is a block diagram of a speech encoding apparatus that shows how a generic VAD operates for a set of speech encoders in a packet voice network to determine whether the current frame is active speech or background noise.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

The apparatus 10 shown in FIG. 1 encodes signals containing voice information. The apparatus 10 comprises a VAD 12 and a voice encoder 14 followed by a packetizer 9 of a known construction. The VAD 12 has an input 16 at which is applied a digitized speech signal. The digital signal can be expressed in pulse coded modulation (PCM) format. The input to the VAD 12 is organized in successive frames of a known duration. The duration of the frame determines the number of voice signal samples contained therein. The frame size is changeable in accordance with the payload size specified for the operation of the packetizer 9 for the chosen speech encoder. For easy understanding, the VAD 12 in the example shown in FIG. 1 processes voice signals having only two different frame sizes, namely frames of 10 ms and frames of 11 ms. At a sampling rate of 8 kHz a 10 ms frame contains 80 samples, while a frame of 11 ms contains 88 samples.

It should be expressly noted that the above are only examples. The number of different frame sizes that the apparatus 10 can handle is a matter of design and can be varied without departing from the spirit of the invention.

The VAD 12 includes a window filter (described later in greater detail). It receives the frames of the digital speech signal and applies a window function on each frame, which has the effect of weighing the samples of the signal in dependence of the window shape. Various window shapes can be considered without departing from the spirit of the invention such as a Hamming window, Hanning window, Blackman window and Bartlet window, among others. For the purpose of the following description the example of a Hamming window will be used.

The VAD 12 releases at an output 10 a control signal indicating whether the frame contains active voice or background noise. Typically, this control signal is a binary signal, where one state would correspond to a frame containing active speech and the other state to a frame containing background noise. The control signal is delivered to control a switch 19.

The encoder 14 receives at input 21 the digital speech signal. The encoder 14 includes a set of different speech encoders (for easy illustration, only the chosen one, the ith, is shown here). Examples include G.711, G.726, G.728, and G.729. It is beyond the scope of this specification to describe in detail the encoding algorithms as a person skilled in the art knows them. The encoded digital speech signal is released from an output 20. The packetizer 9 collects the compressed speech from the output 20 and formats it into packets, based on the payload specification (which includes the payload size) for the corresponding speech encoder for transmission over a packet voice network. If the control signal 18 from the VAD 12 indicates that the current frame is active voice, the switch 19 is closed and the voice packets are transmitted out through to the packet voice network. Otherwise, the transmission of the voice packets is suppressed, and a Silence Insertion Descriptor (SID) 50 describing the background noise, resulting from the VAD operation, is packed into comfort noise (CN) payload and passed to the channel periodically or when there is a significant change in the background noise feature. The SID 50 is known in the art and there is no need to describe this component here.

The VAD 12 operates with a flexible frame size consistent with the corresponding payload size for the chosen speech encoder. In the example considered here, the G.711, G.728 and G.729, plus corresponding packetizers 9, operate on signals having a 10 ms frame while the algorithm G.726 requires an 11 ms frame.

Figure 2:
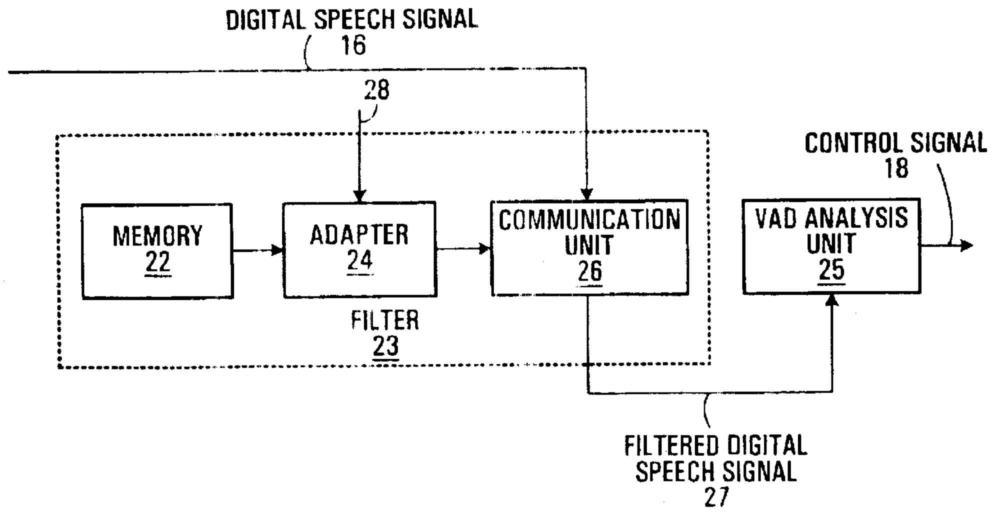
FIG. 2 is a block diagram of a VAD of the apparatus of FIG. 1.

A detailed block diagram of the VAD 12 is shown in FIG. 2. The VAD 12 includes a filter 23 and a VAD analysis unit 25. The filter 23 has a computer readable storage medium 22, which can be in the form of a read-only memory (ROM). The memory 22 communicates with an adapter 24 that, in turn, communicates with a computation unit 26. The computation unit 26 comprises the input 16 that receives the digital speech signal and releases at an output 27 the filtered digital speech signal.

The application of a window function to a frame of the speech signal to be analyzed by the VAD involves the processing of a block of samples of the signal that contains the frame, and in most cases that block will be larger than the frame. The number of samples in that block depends on a parameter of the filter 23, which is the window size. In the example under consideration for easy understanding, it is assumed that the window size is 3 times the frame size of the signal. That is, the current frame signal to be analyzed by the VAD is extended to include a 10 or 11 ms lookahead frame from the input and a 10 or 11 ms from past voice frames. Evidently other values can be chosen without departing from the spirit of the invention. Thus, for a 10 ms frame (80 samples) the corresponding window size has 240 samples. For an 11 ms frame (88 samples) the window size has 264 samples. For this example, the frame is located in the middle of the block on which the processing is done. In order to apply the window function to an extended frame of the input signal, the computation unit 26 multiplies each sample of the extended frame by a specific value that is stored in the memory 22. In the case when the block is larger than the frame, the blocks corresponding to consecutive frames will be overlapped.

To reduce the memory requirements, the memory 22 holds a basic set of values that constitutes a partial representation of a Hamming window. The basic set of values stored in the memory 22 is pre-computed on the basis of equation 1 by selecting a value for N that is in the range defined by the minimal window size and the maximal window size. In this example, the minimal window size is 240 samples and the maximal window size is 264 samples. N is given the value of 256. Therefore, equation 1 generates the following set of values (expressed in Q15 format):

| | | | | | | | |
|---|---|---|---|---|---|---|---|
| 2621, | 2626, | 2640, | 2663, | 2695, | 2736, | 2786, | 2845, |
| 2913, | 2991, | 3077, | 3172, | 3276, | 3388, | 3509, | 3639, |
| 3778, | 3925, | 4080, | 4243, | 4415, | 4595, | 4782, | 4978, |
| 5181, | 5392, | 5610, | 5836, | 6069, | 6309, | 6555, | 6809, |
| 7069, | 7336, | 7609, | 7888, | 8173, | 8464, | 8760, | 9062, |
| 9369, | 9681, | 9998, | 10319, | 10646, | 10976, | 11310, | 11649, |
| 11991, | 12336, | 12685, | 13037, | 13391, | 13749, | 14108, | 14470, |
| 14834, | 15199, | 15566, | 15935, | 16304, | 16674, | 17045, | 17416, |
| 17788, | 18159, | 18530, | 18900, | 19270, | 19639, | 20007, | 20373, |
| 20738, | 21101, | 21461, | 21820, | 22176, | 22529, | 22879, | 23226, |
| 23570, | 23910, | 24247, | 24579, | 24907, | 25231, | 25551, | 25865, |
| 26175, | 26479, | 26778, | 27072, | 27360, | 27642, | 27918, | 28188, |
| 28451, | 28708, | 28958, | 29202, | 29438, | 29667, | 29889, | 30104, |
| 30311, | 30510, | 30702, | 30886, | 31061, | 31229, | 31388, | 31539, |
| 31682, | 31816, | 31942, | 32059, | 32167, | 32266, | 32357, | 32439, |
| 32511, | 32575, | 32630, | 32675, | 32712, | 32739, | 32758, | 32767, |
| 32767, | 32758, | 32739, | 32712, | 32675, | 32630, | 32575, | 32511, |
| 32439, | 32357, | 32266, | 32167, | 32059, | 31942, | 31816, | 31682, |
| 31539, | 31388, | 31229, | 31061, | 30886, | 30702, | 30510, | 30311, |
| 30104, | 29889, | 29667, | 29438, | 29202, | 28958, | 28708, | 28451, |
| 28188, | 27918, | 27642, | 27360, | 27072, | 26778, | 26479, | 26175, |
| 25865, | 25551, | 25231, | 24907, | 24579, | 24247, | 23910, | 23570, |
| 23226, | 22879, | 22529, | 22176, | 21820, | 21461, | 21101, | 20738, |
| 20373, | 20007, | 19639, | 19270, | 18900, | 18530, | 18159, | 17788, |
| 17416, | 17045, | 16674, | 16304, | 15935, | 15566, | 15199, | 14834, |
| 14470, | 14108, | 13749, | 13391, | 13037, | 12685, | 12336, | 11991, |
| 11649, | 11310, | 10976, | 10646, | 10319, | 9998, | 9681, | 9369, |
| 9062, | 8760, | 8464, | 8173, | 7888, | 7609, | 7336, | 7069, |
| 6809, | 6555, | 6309, | 6069, | 5836, | 5610, | 5392, | 5181, |
| 4978, | 4782, | 4595, | 4415, | 4243, | 4080, | 3925, | 3778, |
| 3639, | 3509, | 3388, | 3276, | 3172, | 3077, | 2991, | 2913, |
| 2845, | 2786, | 2736, | 2695, | 2663, | 2640, | 2626, | 2621. |

The second step is to add to this set of values eight 1's (the maximal value of a Hamming window) at the central portion of the 256 point Hamming window. Note that for a Q15 format for a 16-bit integer, this is reflected by the insertion of eight 32767. This operation yields the following set of values:

| | | | | | | | |
|---|---|---|---|---|---|---|---|
| 2621, | 2626, | 2640, | 2663, | 2695, | 2736, | 2786, | 2845, |
| 2913, | 2991, | 3077, | 3172, | 3276, | 3388, | 3509, | 3639, |
| 3779, | 3925, | 4080, | 4243, | 4415, | 4595, | 4782, | 4978, |
| 5181, | 5392, | 5610, | 5836, | 6069, | 6309, | 6555, | 6809, |
| 7069, | 7336, | 7609, | 7888, | 8173, | 8464, | 8760, | 9062, |
| 9369, | 9681, | 9998, | 10319, | 10646, | 10976, | 11310, | 11649, |
| 11991, | 12336, | 12685, | 13037, | 13391, | 13749, | 14108, | 14470, |
| 14834, | 15199, | 15566, | 15935, | 16304, | 16674, | 17045, | 17416, |
| 17788, | 18159, | 18530, | 18900, | 19270, | 19639, | 20007, | 20373, |
| 20738, | 21101, | 21461, | 21820, | 22176, | 22529, | 22879, | 23226, |
| 23570, | 23910, | 24247, | 24579, | 24907, | 25231, | 25551, | 25865, |
| 26175, | 26479, | 26778, | 27072, | 27360, | 27642, | 27918, | 28188, |
| 28451, | 28708, | 28958, | 29202, | 29438, | 29667, | 29889, | 30104, |
| 30311, | 30510, | 30702, | 30886, | 31061, | 31229, | 31388, | 31539, |
| 31E82, | 31816, | 31942, | 32059, | 32167, | 32266, | 32357, | 32439, |
| 32511, | 32575, | 32630, | 32675, | 32712, | 32739, | 32758, | 32767, |
| 32767, | 32767, | 32767, | 32767, | 32767, | 32767, | 32767, | 32767, |
| 32767, | 32758, | 32739, | 32712, | 32675, | 32630, | 32575, | 32511, |
| 32439, | 32357, | 32266, | 32167, | 32059, | 31942, | 31816, | 31682, |
| 31539, | 31388, | 31229, | 31061, | 30886, | 30702, | 30510, | 30311, |
| 30104, | 29889, | 29667, | 29438, | 29202, | 28958, | 28708, | 28451, |
| 28188, | 27918, | 27642, | 27360, | 27072, | 26778, | 26479, | 26175, |
| 25865, | 25551, | 25231, | 24907, | 24579, | 24247, | 23910, | 23570, |
| 23226, | 22879, | 22529, | 22176, | 21820, | 21461, | 21101, | 20738, |
| 20373, | 20007, | 19639, | 19270, | 18900, | 18530, | 18159, | 17788, |
| 17416, | 17045, | 16674, | 16304, | 15935, | 15566, | 15199, | 14834, |
| 14470, | 14108, | 13749, | 13391, | 13037, | 12685, | 12336, | 11991, |
| 11649, | 11310, | 10976, | 10646, | 10319, | 9998, | 9681, | 9369, |
| 9062, | 8760, | 8464, | 8173, | 7888, | 7609, | 7336, | 7069, |
| 6809, | 6555, | 6309, | 6069, | 5836, | 5610, | 5392, | 5181, |
| 4978, | 4782, | 4595, | 4415, | 4243, | 4080, | 3925, | 3778, |
| 3639, | 3509, | 3388, | 3276, | 3172, | 3077, | 2991, | 2913, |
| 2845, | 2786, | 2736, | 2695, | 2663, | 2640, | 2626, | 2621. |

One possibility is to store this entire set of values in the memory 22, however in light of the fact that the window represented by those values is symmetrical one only needs to store one half of the values, and during the computations the other half can be easily generated simply by inverting the order of the values.

The adapter 24 receives as input a control signal 28 designed to notify the adapter 24 of the window size to be used. Based on the information contained in the control signal, the adapter 24 can perform the necessary adaptation of the basic set of values extracted from the memory 22 to generate the proper window values. The control signal 28 can have several origins, one possibility being the encoding section 14 which is 'aware' of the frame size of the signal before performing any encoding. In the context of a communication device, the apparatus 10 conducts a handshaking operation with the remote party with which it intends to communicate such as to establish basic parameters of the communication, one of them being the encoding algorithm to be used which, in turn, determines the frame size of the digital speech signal. Since the frame size can be related to the window size, conveying frame size information to the adapter 24 allows the adapter 24 to perform the necessary adaptation of the basic set of values to generate the proper window values.

Assuming that the adapter 24 receives a control signal 28 indicating that the frame of the digital speech signal has 11 ms, hence the window size encompasses 264 samples, the adapter 24 extracts from the memory 22 the values that partially define the Hamming window and passes this set of values unchanged to the computation unit 26. Therefore, in this case, the adapted set of values that the computation unit 26 will use is identical to the basic set of values held in the memory 22. When the computation unit 26 receives tho adapted set of values, it multiplies the first sample of the 264 samples block by the first value in the adapted set, the second sample by the second value in the adapted set, etc., until the first half of the block has been processed. The second half of the block is processed in an identical manner except that the order of the adapted set of values is reversed. More specifically, the first sample of the second half of the block is multiplied by the last value in the adapted set, the second sample of the second half of the block is multiplied by the value in the adapted set that is next to last, etc.

When the speech encoder is switched, say, from G.726 to G.729, due to the traffic jam, the control signal 28 indicates that the VAD needs to operate on 10 ms frames. This frame corresponds to a 240 samples window size, and the adapter 24 loads the basic set of values from the memory 22 but retains only the values from the $1^{st}$ one to the $120^{th}$ This constitutes the adapted set that is passed to the computation unit 26 for processing.

The computation unit 26 issues at an output 27 the filtered digital signal that is passed to a VAD analysis unit 25 for Liner Predictive Coding (LPC). The VAD analysis unit 25 will process the successive frames of the filtered signal to determine if each frame contains active speech or background noise. It is beyond the scope of this specification to discuss the VAD analysis unit 25 in detail, its structure and operation being known in the art.

The VAD analysis unit 25 comprises the output 18 that releases the control signal passed to the switch 19. This control signal will determine whether the encoded and packetized input signal needs to be suppressed or not, as it is stated before and known to a person skilled in the art.

Figure 3:
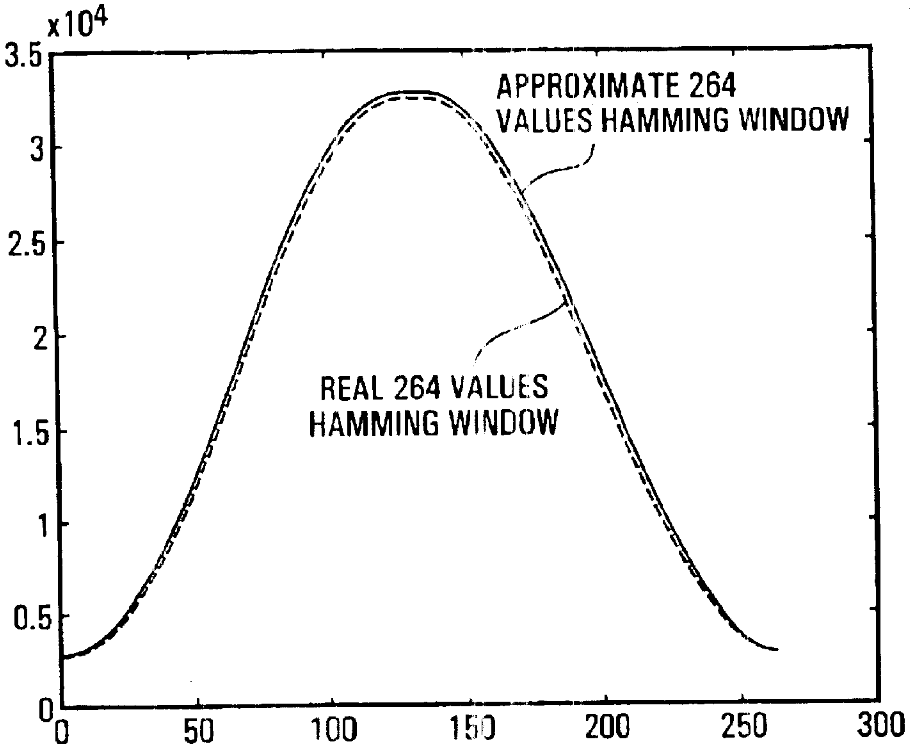
FIG. 3 is a graph comparing the shape of a real Hamming window and an approximate Hamming window for a window size of 264 samples.
Figure 4:
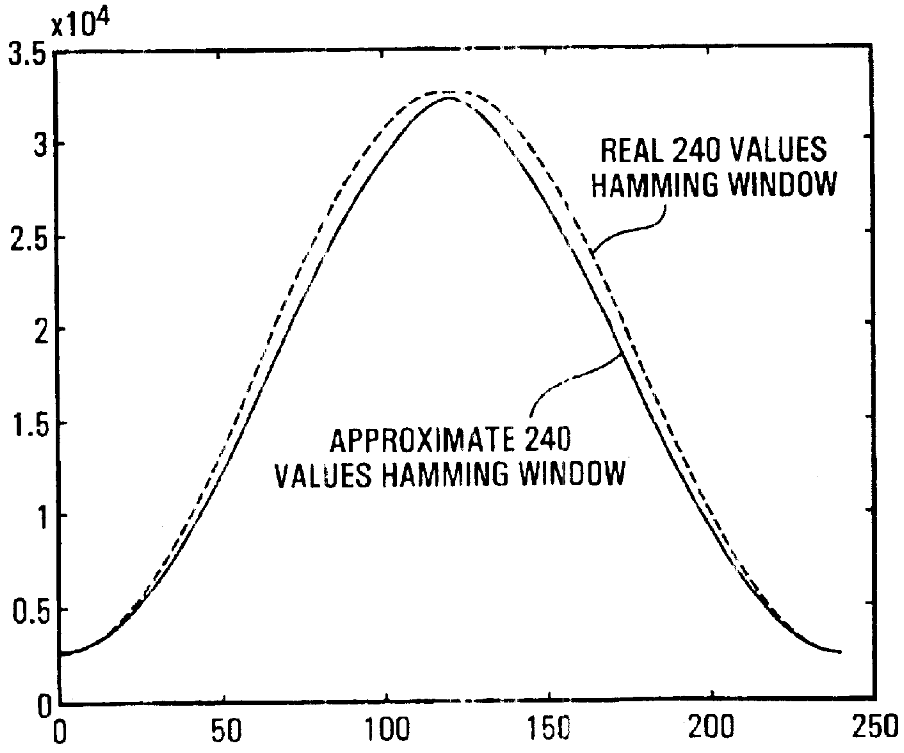
FIG. 4 is a graph comparing a real and an approximate Hamming window for a window size of 240 samples.

FIG. 3 is a graph which illustrates the shape of a Hamming window generated by using equation (1) and the shape of the Hamming window implemented by the filter 23. The real Hamming window generated by using equation (1) is shown in dotted lines while the 264 samples Hamming window (approximate window) implemented by the filter 23 is shown in solid lines. FIG. 4 is similar to FIG. 3 with the exception that the real and tho approximate Hamming windows are shown for window sizes of 240 samples.

Experimental work conducted with the apparatus 10 reveals that the filtering operation using an approximate window by comparison to a filtering operation using a real window does not change in any significant respect the results from the operation shown in FIG. 1 while at the same time significantly reducing the memory requirements of the filter 23.

The apparatus 10 can be implemented in hardware, software or a combination of both.

Although various embodiments have been illustrated, this was for the purpose of describing, but not limiting, the invention. Various modifications will become apparent to those skilled in the art and are within the scope of this invention, which is defined more particularly by the attached claims.

What is claimed is:

1. A filter to apply a window function to a digital signal, said filter comprising:

a) an input to receive a digital signal having successive frames, each frame having a known number of samples;

i) a computer readable storage medium holding a basic set of values representing completely or partially a single window function;

ii) an adapter in communication with said computer readable storage medium operative to produce from said basic set of values a plurality of adapted sets of values, each adapted set of values defining completely or partially a window function characterized by a window size, the window functions defined by the adapted sets of values having different window sizes;

iii) a computation unit in communication with said input to apply a window function on successive frames of the digital signal by using an adapted set of values to generate a filtered digital signal;

b) an output in communication with said computation unit to release the filtered digital signal.

2. A filter as defined in claim 1, wherein the window function applied by said computation unit is selected in the group consisting of Hamming window function, Hanning window function, Blackman window function and Bartlet window function.

3. A filter as defined in claim 2, wherein said input is a first input, said filter further including a second input for receiving a control signal selecting an adapted set of values among the plurality of adapted sets of values, said adapter being in communication with said second input and being responsive to the control signal to produce the selected adapted set of values.

4. A filter as defined in claim 3, wherein the selected adapted set of values is related to a number of samples in the frames of the digital signal applied at said first input.

5. A filter as defined in claim 4, wherein the window size of the window function defined by the selected adapted set of values encompasses a block of samples in the digital signal.

6. A filter as defined in claim 5, wherein the window size of the window function defined by the selected adapted set of values is related to the number of samples in the frames of the digital signal.

7. A filter as defined in claim 6, wherein said computation unit multiplies values from the selected adapted set of values with corresponding samples in the block of samples to apply the window function to a frame of the digital signal.

8. A filter as defined in claim 7, wherein the selected adapted set of values defines solely one half of a window function.

9. A filter as defined in claim 8, wherein each adapted set of values among said plurality of adapted sets of values is either identical to said basic set of values or is constituted by a subset of said basic set of values.

10. A filter as defined in claim 9, wherein the digital signal conveys speech information.

11. A filter as defined in claim 10, wherein each frame of the digital signal applied at said first input has a number of samples selected in the group consisting of 80 and 88.

12. A filter as defined in claim 11, wherein the window function related to a frame having 80 samples has a window size of 240 samples.

13. A filter as defined in claim 11, wherein the window function related to a frame having 88 has a window size of 264 samples.

14. A VAD, comprising:

a) an input to receive a digital signal containing speech information and having successive frames, each frame having a known number of samples;

b) a filter in communication with said input, including;

i) a computer readable storage medium holding a basic set of values representing completely or partially a single window function;

ii) an adapter in communication with said computer readable storage medium operative to produce from said basic sot of values a plurality of adapted sets of values, each adapted set of values defining completely or partially a window function characterized by a window size, the window functions defined by the adapted sets of values having different window sizes;

iii) a computation unit in communication with said input to apply a window function on successive frames of the digital signal by using an adapted set of values from said plurality of adapted sets of values to generate a filtered digital signal;

c) an output in communication with said computation unit to release the filtered digital signal;

d) a VAD analysis unit in communication with said output to process the filtered digital signal; and e) an output in communication with said VAD analysis unit to release a control signal indicating whether a frame of the digital signal contains active speech or background noise.

15. A VAD as defined in claim 14, wherein the window function applied by said computation unit is selected in the group consisting of Hamming window function, Hanning window function, Blackman window function and Bartlet window function.

16. A VAD as defined in claim 15, wherein said input is a first input, said filter further including a second input for receiving a control signal selecting an adapted set of values among the plurality of adapted sets of values, said adapter being in communication with said second input and being responsive to the control signal to produce the selected adapted set of values.

17. A VAD as defined in claim 16, wherein the selected adapted set of values is related to a number of samples in the frames of the digital signal applied at said first input.

18. A VAD as defined in claim 17, wherein the window size of the window function defined by the selected adapted set of values encompassing a block of samples in the digital signal.

19. A VAD as defined in claim 18, wherein the window size of the window function defined by the selected adapted set of values is related to the number of samples in the frames of the digital signal.

20. A VAD as defined in claim 19, wherein said computation unit multiplies values from the selected adapted set of values with corresponding samples in the block of samples to apply the window function to a frame of the digital signal.

21. A VAD as defined in claim 20, wherein the selected adapted set of values defines solely one half of a window function.

22. A VAD as defined in claim 21, wherein each adapted set of values among said plurality of adapted sets of values is either identical to said basic set of values or is constituted by a subset of said basic set of values.

23. A VAD as defined in claim 22, wherein each frame of the digital signal applied at said first input has a number of samples selected in the group consisting of 80 and 88.

24. A VAD as defined in claim 23, wherein the window function related to a frame having 80 samples has a window size of 240 samples.

25. A VAD as defined in claim 24, wherein the window function related to a frame having 88 samples has a window size of 264 samples.

26. A filter to apply a window function to a digital signal, said filter comprising:

a) input means to receive a digital signal having successive frames, each frame having a known number of samples;

i. storage means for holding a basic set of values representing completely or partially a single window function;

ii. first means in communication with said storage means operative to produce from said basic set of values a plurality of adapted sets of values, each adapted set of values defining completely or partially a window function characterized by a window size, the window functions defined by the adapted sets of values having different window sizes;

iii. second means in communication with said input means to apply a window function on successive frames of the digital signal by using an adapted set of values to generate a filtered digital signal;

iv. output means in communication with said second means to release the filtered digital signal.

* * * * *